United States Patent [19]
Dhingra et al.

[11] Patent Number: 5,221,478
[45] Date of Patent: Jun. 22, 1993

[54] CHROMATOGRAPHIC SEPARATION USING ION-EXCHANGE RESINS

[75] Inventors: Yog R. Dhingra; Bruce W. Pynnonen, both of Midland, Mich.

[73] Assignee: The Dow Chemical Company, Midland, Mich.

[21] Appl. No.: 942,484

[22] Filed: Sep. 9, 1992

Related U.S. Application Data

[63] Continuation of Ser. No. 556,585, Jul. 20, 1990, abandoned, which is a continuation-in-part of Ser. No. 152,618, Feb. 5, 1988, abandoned.

[51] Int. Cl.$^5$ .............................................. B01D 15/08
[52] U.S. Cl. ..................................... 210/635; 210/656; 210/198.2; 210/502.1; 127/46.2; 127/46.3
[58] Field of Search ............... 210/635, 656, 659, 681, 210/198.2, 502.1; 127/46.2, 46.3

[56] References Cited

U.S. PATENT DOCUMENTS

| | | | |
|---|---|---|---|
| 3,044,905 | 7/1962 | Lefevre | 127/46 |
| 4,182,633 | 1/1980 | Ishikawa et al. | 127/46 A |
| 4,267,054 | 5/1981 | Yoritomi et al. | 210/659 |
| 4,419,245 | 12/1983 | Barrett et al. | 210/681 |
| 4,443,267 | 4/1984 | Pansolli et al. | 127/46.2 |
| 4,564,644 | 1/1986 | Harris | 521/28 |
| 4,724,082 | 2/1988 | Boom | 210/679 |

FOREIGN PATENT DOCUMENTS

| | | | |
|---|---|---|---|
| 362192 | 3/1961 | Japan | 210/681 |
| 1292226 | 10/1972 | United Kingdom | 210/681 |

OTHER PUBLICATIONS

Ghim et al., Adsorption Characteristics of Glucose and Fructose in Ion-Exchange Resin Columns, Ind. Eng. Chem. Fundam., 1982, 21, pp. 369–374.

Welstein et al., Separation of Glucose and Fructose: Effects of Resin Characterstics on Separation, Ion Exchange Technology, pp. 463–471, Chichester, England, 1979.

John Wiley, Mike's Laboratory Handbook of Chromatography and Allied Methods, New York, 1979, pp. 276–277 and 286–287.

Barker et al., Separation of Fructose from Carbohydrate Mixtures by Semicontinuous Chromatography, Chemical Industries, p. 817, Nov. 17, 1983.

*Primary Examiner*—Ernest G. Therkorn

[57] ABSTRACT

This invention is a process for the chromatographic separation of a fluid mixture in which the mixture is contacted with an ion-exchange resin, eluted through the resin under conditions such that the rate of passage of one component of the mixture through the resin bed is retarded relative to the rate of passage of a second component of the mixture, and a first product stream rich in said first component and a second product stream rich in said second component are recovered. The invention involves the use of an ion-exchange resin made from a copolymer which is prepared in a multistage polymerization process. The use of this resin is found to provide fast separation kinetics and increases the overall speed and efficiency of the separation. This invention is particularly suited for fructose/glucose separations in the preparation of high fructose corn syrup.

26 Claims, No Drawings

CHROMATOGRAPHIC SEPARATION USING ION-EXCHANGE RESINS

CROSS-REFERENCE TO RELATED APPLICATION

This is a continuation of application Ser. No. 07/556,585, filed Jul. 20, 1990, now abandoned, which, in turn, is a continuation-in-part of application Ser. No. 07/152,618, filed Feb. 5, 1988, now abandoned.

BACKGROUND OF THE INVENTION

This invention relates to chromatographic separations, particularly industrial scale chromatographic separations made using an ion-exchange resin as the separating medium.

Chromatographic separations of various substances can be accomplished using ion exchange resins as the stationary phase. Such processes use anion or cation exchange resins to separate mixtures of organic compounds, mixtures of organic compounds and salts, mixtures of acids and salts, and salt mixtures. Of particular commercial importance is the separation of fructose from glucose and oligosaccharides in the production of high fructose corn syrup (HFCS). In this process, mixtures of glucose and fructose are passed through one or more columns of a strong acid type ion exchange resin, most typically in the calcium form. The passage of the fructose through the column is retarded relative to that of the glucose, so there can be obtained separate product streams containing high proportions of fructose and glucose. The high fructose-containing stream is then used as a sweetener for many foodstuffs, such as soft drinks. This process is illustrated by Welstein and Sauer in "Separation of Glucose and Fructose: Effects of Resin Characteristics on Separation", in *Ion Exchange Technology*, Naden and Streat, eds. Society of Chemical Industry, London, pp. 466-471, incorporated herein by reference.

The ion-exchange resin used in such chromatographic separations is typically a plurality of cross-linked copolymer particles which contain anion or cation-exchange groups. Previous to this invention, this resin was a gel-type resin wherein the copolymer is prepared by a one-step suspension polymerization process using a low to moderate level of cross-linker and little or no inert diluent. As used hereinafter, the term "conventional one-step process" refers to a process like that described in U.S. Pat. No. 3,044,905, the teachings of which are incorporated herein by reference.

Although good chromatographic separations can be achieved with the above-described gel resins, improvements which result in a faster, more efficient and/or higher yield operation of the column are always desirable. Thus, it has been attempted to modify the ion-exchange resin to improve its kinetics. All other things being equal, faster exchange kinetics would provide several decided advantages. For example, at a given purity and yield, faster exchange kinetics would permit the column to be operated more rapidly (i.e., use higher feed rates). Alternatively, higher yields and/or product purities could be obtained at equivalent operating conditions if the resin had improved kinetics. Another advantage is that less desorbing solvent could be used, thereby reducing the expense of separating same from the product. Faster kinetics would also allow the use of larger resin particles, which permits a faster feed rate and/or higher feed concentration, thereby obtaining equal or better yield and purity without increasing pressure drop across the bed. A resin having faster kinetics would also permit the feed concentration to be increased in order to obtain a faster production rate.

Besides kinetics, another important parameter of a resin is its flow characteristics, i.e., the ease with which a liquid flows through a bed of the resin. It is desirable that the mobile phase move rapidly through the resin at low pressures. The equipment normally used in commercial chromatographic separation cannot withstand high pressures, so the flow rate cannot be greatly increased merely by increasing the pressure on the mobile phase.

It has been found that most modifications which improve the kinetics of conventional ion-exchange resins simultaneously diminish their flow characteristics. It is known that the kinetics of the resin can be improved by decreasing the particle size or increasing the water retention capacity. Unfortunately, both of these modifications diminish the flow characteristics of the resin so that, at a given pressure, a lower rate of sure, a lower rate of flow of the mobile phase is obtained. In practice, the benefit of the improved kinetics is at least offset by the undesirable worsening of the flow characteristics.

Accordingly, it would be desirable to provide a process for the chromatographic separation of a mixture of two or more materials, using an ion-exchange resin as the stationary phase, wherein a faster, more efficient or higher purity separation is achieved.

SUMMARY OF THE INVENTION

In one aspect, this invention is a process for the chromatographic separation of a fluid mixture comprising at least a first component and a second component into at least a first recoverable stream rich in said first component and another recoverable stream rich in said second component, the process comprising
 (a) contacting said fluid mixture with a bed of an ion-exchange resin exhibiting an apparent cross-link density of at least about 1.1 times the actual cross-link density and having a water retention capacity, on a fully functionalized basis, of at least about 40 percent, said ion-exchange resin being prepared by functionalizing a gel-type copolymer, the gel-type copolymer being prepared in a multistage polymerization process employing seed copolymer particles.
 (b) eluting said fluid mixture such that the fluid mixture passes through said resin bed under conditions such that the rate of passage of said first component through the resin bed is retarded relative to the rate of passage of said second component, and
 (c) recovering a product stream rich in said first component and another product stream rich in said second component, the first component being recovered at a percent yield which is at least about 20% greater than the percent yield obtained when a conventional ion-exchange resin having an equivalent average particle size and water retention capacity is employed in an otherwise similar process.

In another aspect, this invention is an improvement in a process for the chromatographic separation of a fluid mixture, wherein said mixture is passed through an ion-exchange resin bed under conditions such that the rate of passage of one component of said mixture is retarded relative to the rate of passage of at least one other component of said mixture, the improvement comprising employing an ion-exchange resin which is characterized in that it is prepared by a multi-step polymerization process wherein seed copolymer particles are prepared from a monomer mixture having about 0.05 to less than about 5 weight percent of a cross-linking monomer, the ion-exchange resin exhibiting an apparent cross-link density of at least about 1.1 times the actual cross-link level and a water retention capacity, on a fully functionalized basis, of at least about 40 percent, the first component capable of being recovered at a percent yield which is at least 20% greater than the percent yield obtained when a conventional ion-exchange resin having an equivalent average particle size and water retention capacity is employed in an otherwise similar process.

The use of the resin as described herein unexpectedly exhibits faster kinetics than conventional ion-exchange resins of substantially similar particle size and water retention capacity. The use of this resin provides several advantages, including one or more of (1) permitting faster production rates at an equivalent pressure drop, yield and purity; (2) obtaining a higher yield at equivalent operating conditions; (3) obtaining a higher purity product stream at equivalent operating conditions; (4) the ability to use less desorbing solvent (eluent), and/or (5) the ability to use a higher concentration of starting material.

DETAILED DESCRIPTION OF THE INVENTION

In this invention, a mixture is separated into two or more product streams each of which contains a higher proportion (relative to the total solutes) of one of the components of the mixture than did the original mixture. The benefits of this invention, i.e., faster and/or more efficient separations, are largely independent of the composition of the mixture to be separated. Accordingly, any liquid mixture of components which can be separated with ion-exchange resins can be used herein. Ion retardation, ion exclusion and ligand-exchange types of chromatography can be practiced according to this invention. Preferably the components to be separated are organic compounds, mixtures of organic compounds and inorganic salts, mixtures of inorganic compounds, mixtures of acids and salts and salt mixtures which are soluble or miscible in water or a polar organic compound, and more preferably are soluble or miscible in water. Examples of such mixtures include mixtures of organic alcohols, organic amines, organic glycols, mono-, di- and polysaccharides, proteins, amino acids, crude sugars (as in the production of sugar from beet molasses), and the like. Of particular interest are mixtures of fructose and glucose, optionally containing oligosaccharides.

As mentioned before, the mixture to be separated must be a liquid. Whenever one or more of the components of the mixture is a solid at the temperature of the separation, a solvent therefore may be used, provided that the solvent does not undesirably interfere with the separation or react with the ion exchange resin. Preferably the solvent used is water, a polar organic solvent, or other solvent miscible with water, as these swell the resin, thereby facilitating the diffusion of the components of the mixture in and out of the resin particles. Non-polar solvents tend to be excluded from the resin particles, thereby reducing their effectiveness.

In conducting the process of this invention, the mixture is passed through a bed of a certain ion exchange resin. The ion exchange resin comprises a plurality of anion or cation exchange groups which are attached to a cross-linked copolymer matrix. The nature of the functional groups depends somewhat on the particular materials being separated. In the preferred sugar separations, the functional groups preferably are strong or weak acid groups, more preferably are strong acid groups, and most preferably are sulfonic acid groups. The functional groups generally are associated with a counterion. The choice of counterion also depends on the particular materials being separated. In the case of cation-exchange groups, the counterion is typically a hydrogen ion, a metal ion or an ammonium ion. Preferably, the counterion is an alkali metal or an alkaline earth metal ion. In general, more preferred ions include sodium, potassium, calcium, strontium, barium, lead and magnesium. For a fructose/glucose separation, the most preferred counterion is calcium. In the case of anion-exchange groups, halide ions, especially chloride, are preferred.

The resin is further characterized in that it exhibits a water retention capacity of at least about 40 percent by weight, on a fully functionalized basis, and has an apparent cross-link density of at least about 1.1, preferably at least about 1.2, more preferably at least about 1.4 times its actual cross-link density. For the purposes of this invention, "apparent cross-link density" is determined with reference to the swelling characteristics of a conventional single-step gel resin in water. Conventional gel resins [, i.e., those] prepared from copolymer beads made in a single step polymerization[,] exhibit swelling characteristics in water which are related to the proportion of cross-linking monomer used in their production.

Accordingly, the proportion of cross-linking monomer used in making a conventional single step gel resin can be determined, to a high degree of accuracy, by measuring its swell characteristics. The cross-link density indicated by the resin's swelling characteristics is referred to herein as its "apparent cross-link density". An alternative method of determining apparent cross-link density is to swell the copolymer with toluene prior to functionalization. The amount of swelling is related to the cross-link density of a conventional single stage gel copolymer, as described in U.S. Pat. No. 4,564,644, incorporated herein by reference. It has been found that the resins useful in this invention exhibit apparent cross-link densities, as indicated by their swelling characteristics, which are at least 1.1 times as great as the actual proportion of cross-linking monomer used. The actual cross-link density refers to the proportion of polyfunctional monomer used in preparing the copolymer, expressed as a weight percentage of the monomers used. Actual cross-link density can be determined by analytical techniques such as infrared spectroscopy, pyrolysis gas chromatography and nuclear magnetic resonance.

Water retention capacity can be determined by swelling a weighed amount of resin with water, removing excess water and weighing the fully swollen resin. The resin is then dried on a moisture balance until a constant weight is obtained. Water retention capacity is the ratio of water imbibed to the total combined weight of the resin plus imbibed water. Water retention capacity, on a fully functionalized basis, is advantageously at least about 40 percent. However, for the preferred resins having a particle size in excess of about 225 μm, water retention capacity is preferably at least about 43 percent, more preferably at least about 45 percent and most preferably about 45 to about 58 percent. It is noted that the water retention capacity of any resin depends on the counterion. As used herein, the water retention capacity of a cation exchange resin is measured while in the calcium form, and that of an anion-exchange resin is measured while in the chloride form.

The resin preferably has an average particle size from about 170 to about 600, more preferably about 275 to about 500, most preferably about 300 to about 450 μm. The benefits of this invention are particularly seen with the use of resins having particle sizes in excess of about 300 μm. In addition, it preferably has a relatively narrow particle size distribution, with at least 50 volume percent and preferably at least about 90 volume percent of the particles having a diameter which is between 0.9 and 1.1 times the average diameter.

Resins useful in this invention, and which frequently have the foregoing characteristics, are conveniently prepared from copolymers which are themselves prepared in a multi-stage polymerization process. In this invention, a multi-stage polymerization is a polymerization in which the monomers used are added in two or more increments, each increment comprising at least about 5 percent, preferably at least about 10 percent, and most preferably at least about 14 percent of the weight of the monomers. Each increment is followed by complete or substantial polymerization of the monomers added in such increment before the addition of subsequent increments. The socalled seeding techniques, as well as continuous or semi-continuous staged polymerizations as described in U.S. Pat. No. 4,419,245, Great Britain Patent 1,292,226, and Japan Koho 36-2192 (Mar. 28, 1961), all incorporated by reference, are multi-stage polymerizations for the purposes of this invention.

The multi-stage polymerization techniques used in preparing the copolymer can vary in terms of the amount of monomers used in each stage, the proportion of cross-linking monomer used in each stage, and the conditions under which the monomers are added in each stage.

In the so-called batch-seeding process, seed particles comprising from about 10-85 percent of the weight of the product copolymer are produced from a first monomer mixture in a first step. In a subsequent step, a monomer mixture containing a free radical initiator is added to the seed particles, imbibed thereby, and then polymerized. This process is characterized by the presence of a free radical initiator in the monomer mixture which is imbibed by the seed particles, and by adding the monomer mixture to the seed particles under conditions so that substantially no polymerization of the monomer mixture occurs until it is fully imbibed by the seed particles. In this process, the seed particle is advantageously prepared from a monomer mixture containing from about 0.05 to about 5 and preferably from about 0.2 to about 4 weight percent of a cross-linking monomer. The monomer mixture imbibed by the seed may contain from about 1 to about 15, preferably about 4 to about 10 weight percent cross-linking monomer, provided that the proportion of cross-linking monomers in all monomers used in making the copolymer is from about 2 to about 7, preferably about 3 to about 5.5 weight percent.

A related multi-stage process involves preparing seed particles as described in the preceding paragraph, and then adding to it, under polymerization conditions, a monomer mixture containing a free radical initiator. In this process, little or no protective colloid is used in order to facilitate the rapid imbibition of the monomer mixture by the seed particles. The proportion of cross-linking monomer used in this process is similar to that described with respect to the batch-seeding process. Such process is described in U.S. Pat. No. 4,419,245. This process is less preferred due to the generation of very small size byproduct particles.

In preferred processes, the polymerization is characterized in that in the last polymerization stage, a monomer mixture containing substantially no free radical initiator is added under polymerization conditions to copolymer particles formed in preceding polymerization stages, i.e., seed copolymer particles, which contain a source of free radicals. The monomer mixture is imbibed by the copolymer and polymerized therein.

In this preferred process, the last polymerization stage employs a monomer mixture containing substantially no free radical initiator. This mixture, which preferably comprises about 10 to about 80, preferably about 25 to about 75 weight percent of the final copolymer particles, is added to the suspension under polymerization conditions. The copolymer particles formed in earlier stages contain a source of free radicals so that, upon migration to the copolymer particles, the monomer mixture polymerizes therein. Such free radical source may be a previously imbibed initiator, or the residue of a partially polymerized monomer mixture from a preceding polymerization stage. Such a process is described in U.S. Pat. No. 4,564,644, incorporated by reference.

In one embodiment of the preferred process, the copolymer is prepared by (a) in a first step swelling seed copolymer particles with a first monomer mixture containing about 1 to about 8, preferably about 2 to about 6, more preferably about 2 to about 5 weight percent cross-linking monomer, and partially polymerizing said monomer mixture. These seed particles advantageously comprise about 10 to about 70, preferably about 25 to about 60 percent of the weight of the final product copolymer. Such monomer mixture is advantageously polymerized in this stage to about 20 to about 90, preferably about 50 to about 75 percent conversion. The partially polymerized particles are then cooled below polymerization temperature, and a second monomer mixture, containing about 1 to about 10, preferably about 2 to about 8, more preferably about 2 to about 6 weight percent cross-linking monomer but substantially no free radical initiator, is added and imbibed by the particles. The swollen particles are then again exposed to polymerization temperatures until the polymerization is completed.

In an especially preferred process, a seed particle comprising about 5 to about 50, preferably about 10 to about 40 weight percent of the final copolymer is provided. This seed is prepared from a monomer mixture containing a relatively low, i.e., about 0.05 to less than about 5 and preferably about 0.2 to about 4 weight percent of a cross-linking monomer. This seed is then imbibed with a monomer mixture containing a free radical initiator and a substantially higher level of cross-linking monomer, i.e., from about 2 to about 15, preferably about 4 to about 10 weight percent cross-linking monomer. This imbibed monomer mixture advantageously comprises about 5 to about 40, preferably about 10 to about 25 weight percent of the product copolymer. When the imbibed monomer mixture comprises more than about 10 weight percent of the polymer, it is preferred that it contain no more than about 10, preferably no more than about 8 weight percent cross-linking monomer. This imbibed monomer is partially polymerized, advantageously to a conversion of about 10 to about 80 percent, and then, under polymerization conditions, is added a monomer feed over a period of 0.5 to about 8 hours. This monomer feed contains no free radical initiator, and contains from about 0 to about 8, preferably about 2 to about 6 weight percent cross-linking monomer. The proportions of cross-linking monomer in each monomer mixture used in this process are selected together so that in the aggregate, the proportion of cross-linking monomer is about 1 to about 8, preferably about 2 to about 6, more preferably about 3 to about 6 weight percent. After the addition of the monomer feed, polymerization is completed.

The polymerization is advantageously and preferably conducted as a suspension polymerization process, wherein the monomers are dispersed as a plurality of droplets in a continuous aqueous phase and polymerized therein. In this process, staged polymerization is readily accomplished by forming a suspension of an initial increment of monomers, wholly or partially polymerizing same, and then adding the remaining monomers in one or more increments. Each increment may be added at once, or continuously. Due to the insolubility of the monomers in the aqueous phase and their solubility in the copolymer particles, the monomers migrate to the copolymer particles, are imbibed thereby and polymerize therein.

The monomers used herein are addition polymerizable ethylenically unsaturated compounds. Such monomers are well-known in the art and reference is made to *Polymer Processes*, edited by Calvin E. Schildknecht, published in 1956 by Interscience Publishers, Inc., New York, Chapter III, "Polymerization in Suspension" by E. Trommsdorf and C. E. Schildknecht, pp. 69–109 for purposes of illustration. In Table II on pp. 78–81 of Schildknecht are listed diverse kinds of monomers which can be employed in the practice of this invention. Of such suspension polymerizable monomers, of particular interest herein are the water-insoluble monomers including the monovinylidene aromatics such as styrene, vinyl naphthalene, alkylene-substituted styrenes (particularly monoalkyl-substituted styrenes such as vinyltoluene and ethyl vinylbenzene) and halo-substituted styrenes such as bromo- or chlorostyrene, the polyvinylidene aromatics such as divinylbenzene, divinyltoluene, divinylxylene, divinylnaphthalene, trivinylbenzene, divinyldiphenyl ether, divinyldiphenylsulfone and the like; esters of $\alpha,\beta$-ethylenically unsaturated carboxylic acids, particularly acrylic or methacrylic acid, such as methyl methacrylate, ethylacrylate, diverse alkylene diacrylates and alkylene dimethacrylates, and mixtures of one or more of said monomers. Of said monomers, the monovinylidene aromatics, particularly styrene or a mixture of styrene with a monoalkyl- or halo-substituted styrene, the polyvinylidene aromatics, particularly divinylbenzene; esters of $\alpha,\beta$-ethylenically unsaturated carboxylic acids, particularly methyl methacrylate or methacrylonitrile or mixtures containing methyl methacrylate or methacrylonitrile, particularly a mixture of styrene and divinylbenzene or styrene, divinylbenzene and methyl methacrylate are preferably employed herein. These monomers are suitably used in any stage of the polymerization process, as well as the preparation of seed particles, which may be used in this invention in order to control particle size and uniformity. The monomers used in each polymerization stage may be the same or different as those used in the other stages.

Copolymers having an extractable seed are advantageously prepared using a lightly cross-linked seed particle which is insoluble in the amount and type of monomers used in the subsequent polymerization stages, but when active ion-exchange sites are attached thereto, becomes water-soluble and is extractable from the bead when immersed in water. Beads prepared having such extractable seeds will contain small voids when all or a portion of the seed is removed.

In conducting the suspension polymerization, it is advantageous to use a suspending agent, such as gelatin, polyvinyl alcohol, sodium methacrylate, carboxymethylmethylcellulose, surfactants such as sodium lauryl sulfate, sulfonated polystyrenes and the like. In addition, the suspension may contain polymerization inhibitors, dispersants, and other materials advantageously employed in the suspension polymerization of ethylenically unsaturated monomers.

The copolymer particles are converted to anion- or cation-exchange resins using techniques well-known in the art for converting cross-linked addition polymers of mono- and polyethylenically unsaturated monomers to such resins. Sufficient functional groups are introduced to the copolymer to provide the resin with a water retention capacity, on a fully functionalized basis, of at least 40 percent by weight. In the preparation of anion-exchange and chelating resin from poly(vinylaromatic) copolymer particles such as cross-linked polystyrene beads, the beads are advantageously haloalkylated, preferably halomethylated, most preferably chloromethylated, and the active ion-exchange groups subsequently attached to the haloalkylated copolymer. Methods for haloalkylating the copolymer particles and subsequently attaching weak base or chelating groups are also well-known in the art. Illustrative of such are U.S. Pat. Nos. 2,642,417; 2,960,480; 2,597,492; 2,597,493; 3,311,602; 2,632,000; 2,632,001 and 2,992,544 and *Ion Exchange* by F. Helfferich, published in 1962 by McGraw-Hill Book Company, New York, all of which are hereby incorporated by reference. In general, the copolymer particles are haloalkylated by swelling the copolymer with a haloalkylating agent and reacting the copolymer with the haloalkylating agent in the presence of a Friedel-Crafts catalyst. Amine ion-exchange groups are suitably attached to the haloalkylated copolymer by heating it in the presence of at least a stoichiometric amount of ammonia or an amine. Chelating groups are advantageously attached to the haloalkylated copolymer by reaction with an amino acid or an amino pyridine. Chelating groups can also be introduced to an aminated copolymer by reaction with a carboxyl-containing compound such as chloroacetic acid.

Cation-exchange resins can be prepared from the copolymer using methods described, for example, in U.S. Pat. Nos. 3,266,007; 2,500,149; 2,631,127; 2,664,801; and 2,764,564 and F. Helfferich, supra, all incorporated by reference. In general, strong acid resins are prepared by reacting the copolymer with a sulfonating agent such as sulfuric or chlorosulfonic acid or sulfur trioxide. The resin can be converted to the desired form by contacting it with a saturated aqueous solution of a salt or base containing the desired counterion. For example, the resin can be converted to calcium form by contacting it with a $CaCl_2$ or $Ca(OH)_2$ solution. The resin can be converted to other forms in like manner using suitable water-soluble salts of the desired metal.

Resins in which only a specific region of the copolymer is functionalized may also be used in this invention. Examples of such resins are those in which only the exterior portion, or shell, is functionalized. Such a resin will exhibit a water retention capacity which is lower than that of a fully functionalized resin. However, such resin is useful in this invention if its water retention capacity times 5.2 meq/g divided by its dry weight capacity is at least 40 percent, preferably at least about 43 percent. Such a resin would have a water retention capacity, on a fully functionalized basis, of 40% or more, as required herein.

In the process of this invention, the mixture to be separated is passed through a bed of the ion-exchange resin under conditions such that the passage of one component thereof through the resin is retarded relative to that of other component(s) of the mixture. After the mixture is placed in the bed, it is eluted in known manner using a solvent for the components of the mixture. In this manner, the product emerging from the bed will comprise a first eluted stream which is deficient in the component which is retarded, and a later eluted stream which is rich in the component which is retarded. Processes for chromatographic separations using ion-exchange resins are well-known, and are described, for example, by Wankat, *Large-Scale Adsorption and Chromatography*, CRC Press, Inc., Boca Raton, Fla. (1986), and U.S. Pat. Nos. 4,182,633 and 2,985,589, the teachings of which are incorporated herein by reference.

The process of the present invention is distinguished from known chromatographic separation processes due to a remarkably improved separation efficiency. When the ion-exchange resins as previously described herein are employed in a chromatographic separation process, the percent yield of the retarded component is at least about 20% greater, and preferably at least about 30% greater, than the percent yield obtained by use of conventional ion-exchange resins having substantially equivalent or better flow properties in an otherwise similar process. The conventional ion-exchange resin should have a particle size and water retention capacity equivalent to the resin to which it is compared. The term "conventional ion-exchange resins" as used herein refers to resins prepared by a conventional one-step process or resins prepared by a multi-step process which do not correspond to the description, as previously given herein, for resins employed in the process of the present invention. As used herein, the term "percent yield" means a percentage calculated by multiplying a ratio by 100, the ratio being the amount of retarded component recovered at a desired purity divided by the amount of the retarded component in the mixture to be separated. By "purity" it is meant the weight ratio of retarded component to all components in the product stream is a certain, desired percentage, such as 80%.

The conditions of the separation will depend to a large extent on the particular mixture being separated. In general, the temperature at which the separation is conducted is limited by the freezing point and viscosity of the mixture being separated, as well as the boiling point of the mixture, and the temperature at which the components of the mixture or the resin itself begins to decompose. Temperatures from about 20° C. to about 100° C. are generally preferred. The concentration of the components of the feed mixture in any solvent which may be used advantageously is in the range from about 1 percent to about 100 percent, although it is generally preferred to use as concentrated a feed mixture as possible in order to avoid removing large amounts of solvent from the product streams. The feed concentration also depends somewhat on temperature, as highly concentrated solutions of some materials, such as sugars, tend to be highly viscous at lower temperatures. The flow rate used may vary widely, and is again partially dependent on the particular mixture being separated. A flow rate of about 0.1 to about 20, preferably about 0.25 to about 5, more preferably about 0.4 to about 2 bed volumes (a volume of fluid equal to the volume of the resin bed) per hour can be used in most separations. The volume of desorbing solvent (eluent) used can vary widely, and is not particularly critical. In general, it is preferred to minimize the use of desorbing solvent so that a smaller quantity must be removed from the product streams. For example, in continuous processes, from about 0.1 to about 20, preferably about 1 to about 8, more preferably about 2 to about 4 times the volume of the feed mixture can be used. In batch or pulsed mode processes, up to about 50 bed volumes are advantageously used.

In the preferred fructose/glucose separation, an aqueous solution containing a mixture of fructose and glucose, such as is obtained from isomerization processes is passed through the resin bed and eluted with water, so that there is obtained as a product a mixture containing a higher relative concentration of fructose. The product mixture advantageously contains at least about 50 percent fructose, preferably at least about 55 percent fructose, more preferably about 55 to about 99 percent fructose. The separation is preferably conducted at a temperature of about 20° C. to about 80° C., more preferably about 40° C. to about 70° C., most preferably about 50° C. to about 70° C., in order to minimize viscosity and microbial growth without substantially degrading the sugars. Feed concentration is advantageously about 30 to about 75, more preferably about 45 to about 63, most preferably about 50 to about 60 percent by weight. Flow rates are advantageously about 0.1 to about 20, preferably about 0.25 to about 2.5, and more preferably about 0.4 to about 1.5 bed volumes per hour. Eluent volumes are advantageously about 0.1 to about 20, preferably about 1 to about 8, more preferably about 2 to about 4 times the feed volume. Suitable techniques of sugar separations are disclosed in U.S. Pat. Nos. 4,182,633 and 2,985,589, discussed before.

Although a straight elution process can be used, greater efficiency and better separations can be obtained commercially with the use of recycling or countercurrent, simulated countercurrent or pseudo-moving bed (simulated moving bed) processes. Such processes are described, for example, in Wankat, supra, *Food Processing*, July 1979, pp. 74–75, *Chemical Engineering*, Jan. 24, 1983, pp. 50–52, and Bieser and de Rosset, "Continuous Countercurrent Separation of Saccharides with Inorganic Adsorbents", *Die Starke*, Jahrg. 1977, No. 11, pp. 392–397, all incorporated herein by reference.

The following examples are provided to illustrate the invention, but are not intended to limit the scope thereof. All parts and percentages are by weight unless otherwise indicated.

EXAMPLE 1

A. Preparation of Ion-exchange Resin in a Multi-stage Polymerization Process

In a suitable polymerization kettle is formed a suspension of 160 parts of seed copolymer particles uniformly having an average diameter of about 165 μm in 600 parts of water. The seed particles are a copolymer of a monomer mixture of styrene and 0.2 percent active divinylbenzene (DVB). To this suspension are added 200 parts of a mixture of a styrene/divinylbenzene mixture containing 8.5 percent active divinylbenzene, in which a peroxide initiator is dissolved. This mixture is imbibed by the seed particles over a 30-minute period at room temperature with agitation. Then, 200 parts of an aqueous solution containing a surfactant and a protective colloid (gelatin) is added. The kettle is sealed, nitrogen purged and heated up to 80° C., at which temperature polymerization of the monomers in the initial swell begins. After two hours of polymerization, a final stage polymerization is begun by continuously adding 440 parts of a styrene/divinylbenzene mixture (2 percent active DVB) over a four-hour period while maintaining the polymerization temperature at 80° C. The reactor is then heated an additional two hours at 80° C. followed by another two hours at 110° C. The resulting copolymer particles are cooled, cleaned up and sulfonated to provide a cation exchange resin having a dry weight capacity of 5.20 meq/g, water retention capacity of 52.7 percent in the calcium form and a mean diameter of 430 μm in the calcium form. This resin is designated Sample No. 1 herein.

B. Chromatographic Performance Testing

A portion of resin Sample No. 1 is placed in a 25 mm × 1280 mm jacketed glass chromatography column with an attached expansion column. The resin is backflushed with degassed deionized water followed by two hours backflushing with an aqueous CaCl$_2$ solution (7 g CaCl$_2$/100 ml solution). The resin is then equilibrated with the CaCl$_2$ solution for at least six hours, tapped down to provide a uniform packing, and sealed. The column is then flushed with degassed deionized water and heated to 60° C. A total of about 78 ml of a hot (60° C.) commercial high fructose corn syrup of 50 percent dissolved solids content is fed into the column at a rate of 11–13 ml/min. The composition of the solids is fructose: 41–43 percent; glucose: 50–52 percent; oligosaccharides: 6–7 percent. Immediately after the syrup is loaded on the column, it is eluted with 60° C. degassed deionized water, again at a rate of about 11–13 ml/min. Samples of the effluent from the column are collected at half-minute intervals and quantitatively analyzed for the individual components eluting from the column. The experiment is continued until the product stream contains less than 1 percent dissolved solids. The glucose is eluted faster than the fructose, so the earlier samples are rich in glucose and the later fractions are rich in fructose. The average production rate, in pounds of fructose per cubic foot of resin per hour at 80 percent purity, the average concentration of carbohydrate in the product cut, and the percent yield are reported in Table I following.

Percent yield is determined from the consecutive samples collected at the end of the experiment which cumulatively have a fructose purity of 80%, i.e., the weight ratio of fructose to total carbohydrates contained in the samples, is 80 percent.

The percent yield is 100 times the total amount of fructose contained in those samples divided by the total amount of fructose recovered before the experiment is terminated. The percent yield is a measure of the comparative separation efficiency of different resins.

For comparison, the foregoing separation is attempted using an ion-exchange resin prepared from styrene-divinylbenzene copolymer particles made in a conventional one-step process and having an active divinylbenzene content of 6 percent (Comparative Sample A). The resin has a dry weight capacity of about 5.2 meq/g, a water retention capacity of about 49 percent in the calcium form and an average diameter of 390 μm in the calcium form. The results are as reported in Table I. This resin is seen to provide a poorer separation, a lower production rate and a lower product concentration, meaning that the column provides less purified product and more water must be removed from the product.

As a further comparison, a conventional one-step process resin similar to that used in Comparative Sample A is used to effect a like separation, except this time the particle size is only 350 μm in the calcium form (Comparative Sample B). This resin is expected to provide a more efficient separation than the larger resins.

The results are as reported in Table I. The production rate and the average carbohydrate concentration are less than that provided by Sample No. 1.

EXAMPLE 2

A. Preparation of Ion-exchange Resin in a Multi-stage Polymerization Process

In a suitable polymerization vessel are added 44 parts of a styrene/divinylbenzene mixture (3 percent active DVB) in which are dissolved a peroxide type free radical initiator, and about 100 parts of an aqueous suspension medium containing a carboxymethylmethylcellulose suspending agent. The monomer mixture is formed into a plurality of uniform droplets suspended in the aqueous medium, and partially polymerized at 80° C. for about five hours to form a seed particle containing some dissolved monomers and residual initiator. Then, in a final polymerization stage, about 56 parts of a styrene/divinylbenzene mixture (5 percent active DVB) are added continuously over a 4- to 4½-hour period while maintaining the polymerization temperature at 80° C. Following the final monomer addition, the polymerization is continued for an additional four hours at 80° C. and two more hours at 110° C. The resulting copolymer is sulfonated to yield a cation-exchange resin having a dry weight capacity of 5.15 meq/g, a water retention capacity of 52.5 percent in the calcium form and an average diameter of 402 μm in the calcium form. This resin is referred to herein as Sample No. 2.

TABLE I

| Property | Sample Number | | |
|---|---|---|---|
| | 1 | A* | B* |
| Resin Size, μm | 430 | 390 | 350 |
| Water Retention Capacity, % | 52.7 | 49 | 49 |
| % Yield | 53 | 31 | 38 |
| Average Production Rate① | 0.88 | 0.56 | 0.66 |
| Average Carbohydrate Concentration② | 7.4 | 4.8 | 6.3 |

① In pounds of fructose/cubic foot of resin/hour.
② In grams of carbohydrate/100 ml of product stream.

Resin Sample No. 2 is used in a fructose/glucose separation as described in Example 1. The yield at 80 percent purity is 41 percent. The production rate is 0.71 pounds fructose/ft$^3$/hour and the average concentration is 6.3 g/ml. The yield is higher than provided by either Comparative Sample A or Comparative Sample B, even though the resin is larger. In addition, the production rate equals or exceeds that obtained with the Comparative Samples.

EXAMPLES 3-9

A series of ion-exchange resins are used in this example to separate fructose from glucose. Resin Sample Nos. 3-9 are made by sulfonating a copolymer which is prepared according the general procedure described in Example 1, with the relative amounts of seed particle and monomer mixtures in the initial swell and final polymerization stage being varied, as well as the amount of DVB used in the seed and monomer mixtures. The weight ratios of seed and monomer mixtures used in the polymerization stages, and the amount of DVB used in each are reported in Table II following. Before sulfonation, the apparent cross-link density is determined by toluene swell testing. The water retention capacity and particle size of the resin in the calcium form are also determined. The yield at 80 percent purity provided by the resin when used to separate fructose and glucose as described in Example 1 is determined. The water retention capacity, particle size and percent yield are all reported in Table II. For comparison, the results obtained using two conventional resins, Comparative Samples C and D, are also reported. Resins employed in Comparative Samples C and D are prepared in a manner substantially similar to the resins of Comparative Samples A and B in Example 1, except the amount of cross-linking monomer, divinylbenzene, is 5.7% rather than 6%.

EXAMPLES 10-13

Resin Sample Nos. 10-13 are prepared using the general procedure described in Example 2, varying the amount of DVB used in the monomer mixtures and the relative proportion of monomers used in the polymerization stages, as indicated in Table II. The apparent cross-link density of the copolymer and the water retention capacity, particle size and yield at 80 percent purity provided by the resins are reported in Table II.

As can be seen from the data presented in Table II, excellent yields are obtained with the process of this invention using ion-exchange resins prepared in a multi-step polymerization process as described herein. In most instances, high yields are obtained even though the resin particles are quite large, which provides the added benefit of low pressure drop across the column.

EXAMPLE 14

A. Preparation of Ion-exchange Resin in a Multi-stage Polymerization Process In a suitable polymerization kettle is formed a suspension of 500 parts of seed copolymer particles of uniform diameter of about 190 μm in 900 parts of water. The seed particles are a copolymer of a monomer mixture of styrene and 2.5 percent active divinylbenzene (DVB). To this suspension are added 213 parts of a mixture of a styrene/divinylbenzene mixture containing 5 percent active divinylbenzene, in which a peroxide initiator is dissolved. This mixture is imbibed by the seed particles over a 60-minute period at room temperature with agitation. Then, 300 parts of an aqueous solution containing a surfactant and a protective colloid (gelatin) is added. The kettle is sealed, nitrogen purged and heated up to 80° C., at which temperature polymerization of the monomers in the initial swell begins. After about one to about two hours of polymerization, a final stage polymerization is begun by continuously adding 740 parts of a styrene/divinylbenzene mixture (3 percent active DVB) over a five-hour period while maintaining the polymerization temperature at 80° C. The reactor is then heated an additional two hours at 80° C. followed by another two hours at 110° C. The resulting copolymer particles are cooled, cleaned up and sulfonated to provide a cation-exchange resin having a dry weight capacity of about 5.10 to 5.20 meq/g, water retention capacity of 50.1 percent in the calcium form and a mean diameter of 389 μm in the calcium form. This resin is designated Sample No. 14 herein.

B. Chromatographic Performance Testing

A portion of resin Sample No. 14 is tested for chromatographic performance following the general procedure described in Example 1. The column in this in-

TABLE II

| Sample No. | % DVB Seed/Initial Swell/Final Stage[1] | Weight Ratio Seed/Initial Swell/Final Stage[2] | % App. DVB/ % Actual DVB[3] | ACD[8] | WRC (Ca)[4] | Ave. Part. Size[5] | % Yield[6] |
|---|---|---|---|---|---|---|---|
| 3 | 1.5/10/4 | 1/1/2.09 | 8.6/4.85 | 1.77 | 46.0 | 538 | 38 |
| 4 | 1.5/10/2 | 1/0.34/2.67 | 3.0/2.36 | 1.27 | 59.7 | 542 | 40 |
| 5 | 1.5/8/5 | 1/0.34/2.19 | 5.5/4.1 | 1.34 | 49.1 | 482 | 39 |
| 6 | 1.5/8/4 | 1/0.34/1.65 | 4.9/3.64 | 1.35 | 52.2 | 413 | 48 |
| 7 | 1.5/3/5 | 1/0.43/1.53 | 6.2/3.52 | 1.76 | 50.5 | 400 | 53 |
| 8 | 2.5/3.0/3 | 1/0.43/1.53 | 6.0/2.83 | 2.12 | 51.3 | 402 | 47 |
| 9 | 2.5/8/4 | 1/0.34/1.78 | 6.0/3.95 | 1.51 | 50.3 | 402 | 45 |
| 10[7] | 4/—/4 | 1/—/1.25 | 6.0/4.0 | 1.50 | 50.1 | 411 | 41 |
| 11[7] | 4/—/4 | 1/—/1.25 | 6.0/4.0 | 1.50 | 50.1 | 483 | 42 |
| 12[7] | 3/—/5 | 1/—/1.25 | 4.9/4.11 | 1.19 | 52.5 | 410 | 41 |
| 13[7] | 5/—/4 | 1/—/1.5 | 7+/4.4 | 1.59 | 46.9 | 450 | 38 |
| C* | 5.7% Single Stage | Single Stage | 5.7/5.7 | 1.0 | 50.0 | 350 | 38 |
| D* | 5.7% Single Stage | Single Stage | 5.7/5.7 | 1.0 | 49.0 | 505 | 29 |

*Not an example of this invention.
[1]% Active DVB used, as a proportion of monomer used in preparing the seed, and in the initial swell and final polymerization stage.
[2]Weight ratio of monomers used in the various polymerization stages.
[3]Actual average DVB content/apparent DVB content by toluene swell of copolymer.
[4]Water retention capacity of resin in calcium form, in percent.
[5]Average particle size of the resin in the calcium form, in microns.
[6]Yield of fructose at 80% purity.
[7]No initial swell is made in Sample Nos. 10-13.
[8]Apparent cross-link density (ACD) is the ratio of % apparent DVB to % actual DVB.

stance has dimensions of 76 mm × 1220 mm. About 1050 to 1200 ml of high fructose corn syrup are fed to the column at a rate of 46 ml/min. Eluting water is then fed at the same rate. A 72 percent yield at 80 percent purity is obtained, at a production rate of 0.99 pound of fructose per cubic foot of resin per hour. The average concentration of carbohydrate in the product cut is 20.6 g/100 ml. For comparison, the same separation, when conducted using Comparative Sample A, gives only a 59 percent yield and a production rate of only 0.93 pounds of fructose per cubic foot of resin per hour at 80 percent fructose purity. The concentration of carbohydrate in the product cut is also only 17.8 g/100 ml.

This experiment is repeated, this time doubling the feed rate of both the corn syrup and the eluting water. Sample No. 14 provides a 43 percent yield at 80 percent purity, and a production rate of 1.25 pounds of fructose per cubic foot of resin per hour. The average concentration of carbohydrate in the product cut is 13.4 g/100 ml. Under these conditions, Comparative Sample A provides a 36% yield at 80 percent purity, and a production rate of 1.08 pounds of fructose per cubic foot of resin per hour. The average concentration of carbohydrate in the product cut is 12.6 g/100 ml.

As a further experiment, Sample No. 14 is tested under the same conditions set out in Example 1. A 59 percent yield at 80 percent purity, and a production rate of 1.14 pounds of fructose per cubic foot of resin per hour are achieved. The average concentration of carbohydrate in the product cut is 7.6 g/100 ml.

EXAMPLE 15

In a suitable polymerization kettle is formed a suspension of about 400 parts of seed copolymer particles having a uniform diameter of about 250 μm in about 700 parts water. The seed particles are a copolymer of a monomer mixture of styrene and 4.0 percent active DVB. To this suspension are added 200 parts of a mixture of styrene and 8 percent active DVB, in which a peroxide initiator is dissolved. This mixture is imbibed by the seed particles over a 60-minute period at room temperature with agitation. Then, 300 parts of an aqueous solution containing a protective colloid and an aqueous polymerization inhibitor is added. The kettle is sealed, nitrogen purged and heated to 80° C. for 10 hours, followed by 90 minutes at 95° C. and 90 more minutes at 110° C., respectively. The resulting polymer is cleaned up and sulfonated to yield a cation-exchange resin having a dry weight capacity of 5.2 meq/g, a water retention capacity of 47.4 percent in the calcium form and a mean diameter of 460 μm in the calcium form. When evaluated in a chromatographic separation as described in Example 1, this resin provided a 38 percent yield at 80 percent purity. Production rate was 0.72 pound of fructose per cubic foot of resin per hour and concentration was 4.6 g of carbohydrate/100 ml.

What is claimed is:

1. A process for the chromatographic separation of a fluid mixture which contains at least a first component and a second component into a recoverable stream rich in said first component and another recoverable stream rich in said second component, wherein at least one of said first and second components is a saccharide, comprising
   (a) contacting said fluid mixture with a bed of an ion-exchange resin exhibiting an apparent cross-link density of at least about 1.1 times the actual cross-link density and having a water retention capacity, on a fully functionalized basis, of at least about 40 percent, said ion-exchange resin being prepared by functionalizing a gel-type copolymer, the gel-type copolymer being prepared in a multistage polymerization process employing seed copolymer particles,
   (b) eluting said fluid mixture such that the fluid mixture passes through said resin bed under conditions such that the rate of passage of said first component through the resin bed is retarded relative to the rate of passage of said second component, and
   (c) recovering a product stream rich in said first component and another product stream rich in said second component, the first component being recovered at a percent yield which is at least about 20% greater than the percent yield obtained when an ion-exchange resin made from a single step process having an equivalent average particle size and water retention capacity is employed in an otherwise similar process.

2. The process of claim 1 wherein said first component is an organic compound and said second component is an inorganic compound.

3. The process of claim 1 wherein said first component and second component in said fluid mixture are water-soluble or water-miscible organic compounds.

4. The process of claim 3 wherein said ion-exchange resin is a cation-exchange resin.

5. The process of claim 4 wherein said fluid mixture is eluted with water or a polar organic compound.

6. The process of claim 5 wherein said ion-exchange resin contains a plurality of sulfonic acid groups.

7. The process of claim 6 wherein said ion-exchange resin is prepared by functionalizing a gel-type copolymer which is made in a multi-stage polymerization process wherein mixtures of ethylenically unsaturated monomers are polymerized in successive polymerization stages, wherein in a last polymerization stage, a monomer mixture containing substantially no free radical initiator is added under polymerization conditions to a free radical-containing copolymer formed in one or more preceding polymerization stages, imbibed thereby and polymerized therein.

8. The process of claim 7 wherein the seed copolymer particles are prepared from a monomer mixture having about 0.05 to less than about 5 weight percent of a cross-linking monomer.

9. The process of claim 7 wherein said copolymer is a copolymer of styrene and divinylbenzene.

10. The process of claim 7 wherein said fluid mixture comprises at least two saccharides.

11. The process of claim 10 wherein said saccharides comprise fructose and glucose.

12. The process of claim 11 wherein said ion-exchange resin is in the calcium form.

13. The process of claim 12 wherein said ion-exchange resin has an average particle size of about 300–450 μm.

14. The process of claim 6 wherein said ion-exchange resin is prepared by functionalizing a copolymer made in a batch-seeded process.

15. The process of claim 14 wherein the seed copolymer particles are prepared from a monomer mixture having about 0.05 to about 5 weight percent of a cross-linking monomer.

16. The process of claim 6 wherein said ion-exchange resin is prepared by functionalizing a copolymer made by swelling the seed copolymer particles with a first monomer mixture, partially polymerizing the first monomer mixture, then cooling said partially polymerized particles below polymerization temperature, swelling said seed particles with a second monomer mixture, and then polymerizing said swollen seed particles.

17. The process of claim 16 wherein the seed copolymer particles are prepared from a monomer mixture having about 0.05 to less than about 5 weight percent of a cross-linking monomer.

18. In a process for the chromatographic separation of a fluid mixture, wherein said mixture is passed through an ion-exchange resin bed under conditions such that the rate of passage of a first component of said mixture is retarded relative to the rate of passage of at least a second component of said mixture, wherein at least one of said first and second components is a saccharide, the improvement comprising employing an ion-exchange resin which is characterized in that it is prepared by a multi-step polymerization process wherein seed copolymer particles are prepared from a monomer mixture containing about 0.05 to less than about 5 weight percent of a cross-linking monomer, the ion-exchange resin exhibiting an apparent cross-link density of at least about 1.1 times the actual cross-link level and a water retention capacity, on a fully functionalized basis, of at least about 40 percent, the first component capable of being recovered at a percent yield which is at least 20% greater than the percent yield obtained when an ion-exchange resin made from a single step process having an equivalent average particle size and water retention capacity is employed in an otherwise similar process.

19. The process of claim 18 wherein said first component and second component in said fluid mixture are water-soluble or water-miscible organic compounds.

20. The process of claim 19 wherein said ion-exchange resin is a cation-exchange resin.

21. The process of claim 20 wherein said fluid mixture is eluted with water or a polar organic compound.

22. The process of claim 21 wherein said ion-exchange resin contains a plurality of sulfonic acid groups and the resin has a dry weight capacity of at least about 4.5 meq/g.

23. The process of claim 22 wherein said fluid mixture comprises at least two saccharides.

24. The process of claim 23 wherein said saccharides comprise fructose and glucose.

25. The process of claim 24 wherein said ion-exchange resin is in the calcium form.

26. The process of claim 18 wherein said first component is an organic compound and said second component is an inorganic compound.

* * * * *